United States Patent
Neelam et al.

(10) Patent No.: US 11,977,580 B2
(45) Date of Patent: May 7, 2024

(54) PARTITIONING AND PARALLEL LOADING OF PROPERTY GRAPHS WITH CONSTRAINTS

(71) Applicant: International Business Machines Corporation, Armonk, NY (US)

(72) Inventors: Sumit Neelam, Bangalore (IN); Hima Prasad Karanam, Bangalore (IN); Udit Sharma, New Delhi (IN); Shajith Ikbal Mohamed, Chennai (IN); Santosh Srivastava, New Delhi (IN); L. Venkata Subramaniam, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 17/537,854

(22) Filed: Nov. 30, 2021

(65) Prior Publication Data

US 2023/0169115 A1    Jun. 1, 2023

(51) Int. Cl.
*G06F 16/901* (2019.01)
*G06F 16/2453* (2019.01)
*G06N 20/00* (2019.01)

(52) U.S. Cl.
CPC .... *G06F 16/9024* (2019.01); *G06F 16/24532* (2019.01); *G06N 20/00* (2019.01)

(58) Field of Classification Search
CPC ....................... G06F 16/9024; G06F 16/24532
See application file for complete search history.

(56) References Cited

U.S. PATENT DOCUMENTS

| | | | |
|---|---|---|---|
| 1,005,509 A | 10/1911 | Carlson | |
| 9,563,687 B1 * | 2/2017 | Dutta | G06F 16/2282 |
| 10,146,801 B2 | 12/2018 | Savkli | |
| 10,769,535 B2 | 9/2020 | Lindsley | |

(Continued)

OTHER PUBLICATIONS

Oracle.com, Using Property Graphs in an Oracle Database Environment, https://docs.oracle.com/en/database/oracle/oracle-database/12.2/spgdg/using-property-graphs-oracle-database.html#GUID-4B5AF258-79BE-418D-84FF-9B8A692B8604 , Jun. 2017.

(Continued)

*Primary Examiner* — Grace Park
(74) *Attorney, Agent, or Firm* — Ryan, Mason & Lewis, LLP

(57) ABSTRACT

Methods, systems, and computer program products for partitioning and parallel loading of property graphs with constraints are provided herein. A computer-implemented method includes obtaining graph-related input data and corresponding constraint data, wherein the graph-related input data and corresponding constraint data are at least one of user-defined and input data model-based; generating at least one in-memory graph based at least in part on processing at least a portion of the obtained graph-related input data; partitioning the at least one in-memory graph into two or more sub-graphs by processing the at least one in-memory graph using one or more polynomial time partition algorithms; and generating at least one property graph by allocating, at least a portion of the two or more partitioned sub-graphs which satisfy the obtained constraint data, to two or more threads that run in parallel.

20 Claims, 7 Drawing Sheets

(56) References Cited

U.S. PATENT DOCUMENTS

| | | | |
|---|---|---|---|
| 2007/0121510 A1* | 5/2007 | Chekuri | H04L 45/46 370/235 |
| 2011/0022636 A1* | 1/2011 | Yalamanchi | G06F 16/24565 707/E17.127 |
| 2012/0054255 A1* | 3/2012 | Buxbaum | G06F 9/50 708/235 |
| 2015/0178620 A1* | 6/2015 | Ascari | G06N 20/00 706/21 |
| 2015/0370919 A1 | 12/2015 | Burnhevd et al. | |
| 2017/0032052 A1 | 2/2017 | Raman et al. | |
| 2020/0112502 A1* | 4/2020 | Wang | H04L 43/026 |
| 2021/0374143 A1* | 12/2021 | Neill | G06F 16/254 |

OTHER PUBLICATIONS

Durand et al, Piecing together large puzzles, efficiently: Towards scalable loading into graph database systems, https://www.semanticscholar.org/paper/Piecing-Together-Large-Puzzles%2C-Efficiently%3A-Into-Durand-Ma/cf72a6fbb0027dc2de519023fb6b65d39b305e85 , May 2018.

Tomaszuk, D., Research Conference on Metadata and Semantics Research, RDF Data in Property Graph Model, https://link.springer.com/chapter/10.1007%2F978-3-319-49157-8_9 , Nov. 2016.

Malewicz et al., Pregel: A System for Large-Scale Graph Processing, SIGMOD'10, Jun. 6-11, 2010.

Neo4j.com, Neo4j Import, https://neo4j.com/docs/operations-manual/current/tools/neo4j-admin/neo4j-admin-import/, accessed Nov. 30, 2021.

\* cited by examiner

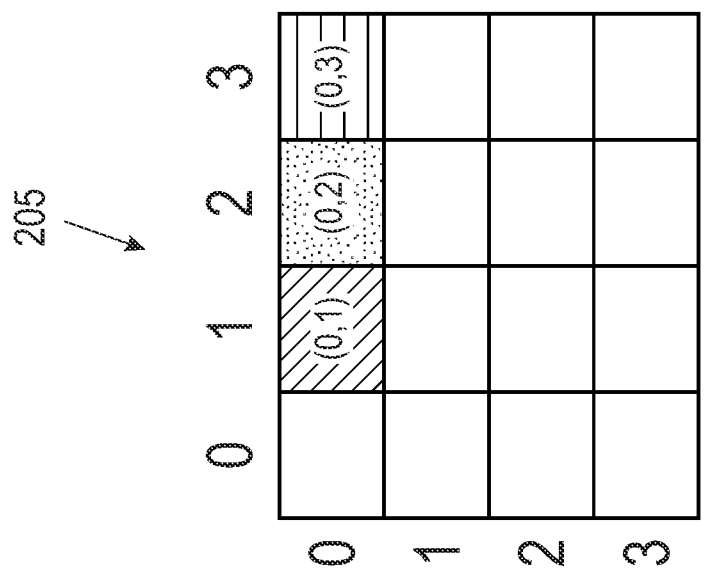
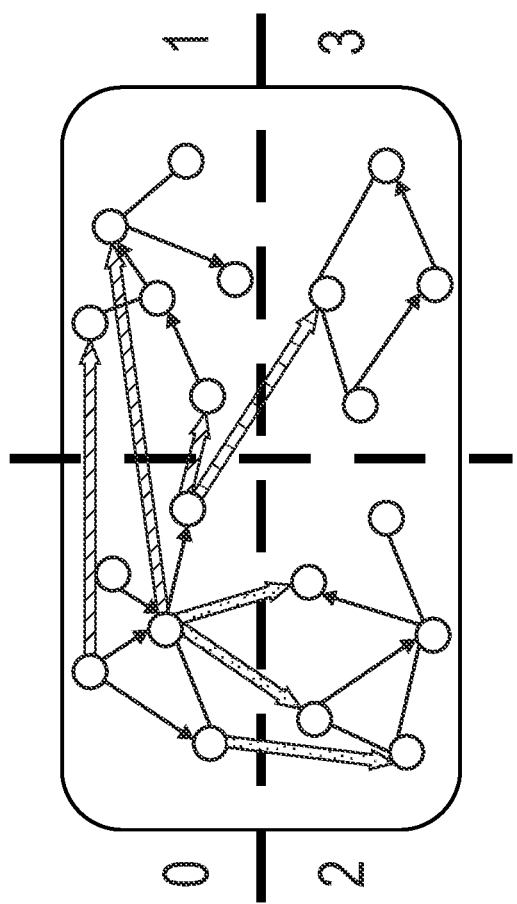
FIG. 2B
FIG. 2A

PARTITIONING AND PARALLEL LOADING OF PROPERTY GRAPHS WITH CONSTRAINTS

BACKGROUND

The present application generally relates to information technology and, more particularly, to data management techniques. More specifically, graphs are increasingly used in connection with storage models for linked datasets, as graphs can utilize graph analysis algorithms which are not commonly used in other data models such as relational and/or resource description framework (RDF) models. For example, storing data in a property graph model can add scope for analyzing and performing operations on data.

However, property graph ingestion can be very slow due to its storage model, and if ingestion is attempted to be hastened through multiple threads, it can result in an inconsistent graph which may not fulfill constraint requirements.

SUMMARY

In one embodiment of the present invention, techniques for partitioning and parallel loading of property graphs with constraints are provided. An example computer-implemented method includes obtaining graph-related input data and corresponding constraint data, wherein the graph-related input data and corresponding constraint data are at least one of user-defined and input data model-based, generating at least one in-memory graph based at least in part on processing at least a portion of the obtained graph-related input data, and partitioning the at least one in-memory graph into two or more sub-graphs by processing the at least one in-memory graph using one or more polynomial time partition algorithms. The method additionally includes generating at least one property graph by allocating, at least a portion of the two or more partitioned sub-graphs which satisfy the obtained constraint data, to two or more threads that run in parallel.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2A is a diagram illustrating an in-memory graph and FIG. 2B is a diagram illustrating a corresponding sub-graph, according to an example embodiment of the invention;

DETAILED DESCRIPTION

Figure 1:
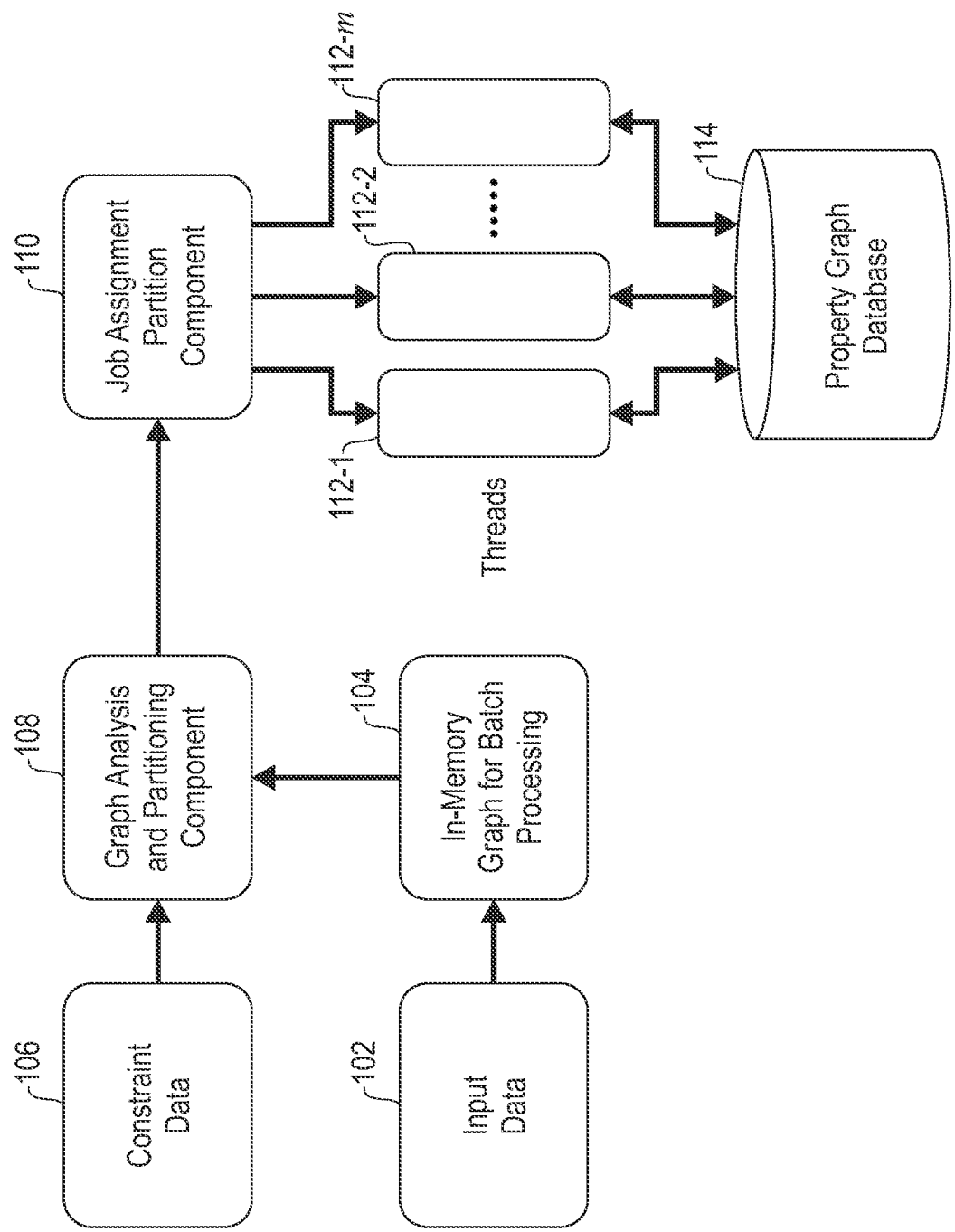
FIG. 1 is a diagram illustrating system architecture, according to an example embodiment of the invention.

As described herein, at least one embodiment includes partitioning and parallel loading of property graphs with constraints. As is to be understood by one skilled in the art, in a property graph model, data are organized in a typed graph as nodes, relationships and properties. Typed graphs can contain type (label) information for each node and relationship. Also, nodes and relationships can store data as properties in the form of key-value pairs. Such an embodiment can additionally include implementing a parallel graph creation system which encompasses and/or processes constraint information provided with the graph data.

By way of example, within the context of RDF requirements, an edge cannot exist with the same label between a pair of vertices. Therefore, if the same subject, predicate, object (S, P, O) triple is added on native RDF storage, the triple would be stored once; however, a property graph model would add multiple edges between S and P with label P if the same (S, P, O) triple is added more than once. Further, using forward chaining, for instance, a similar problem can surface with naïve parallel loading. Accordingly, one or more embodiments include enforcing node-level and node-pair-level constraints in directed property graphs. Also, in such an embodiment, a given property graph can adopt at least one adjacency list storage model, which contains outgoing and incoming edges adjacency lists as well as one or more properties key-values parts. As used herein, an adjacency list storage model graph can be physically stored as a set of vertices with their adjacency list, wherein an adjacent list of a vertex holds all incident edges of the vertex. Additionally, at least one embodiment includes controlling graph element access by taking such architecture into consideration when solving a problem (e.g., such as noted above).

By way of illustration, consider an example embodiment which includes enforcing an edge cardinality constraint in graph. For instance, such a constraint might state that a person cannot have more than two accounts across banks. Accordingly, in a graph, a person node cannot be connected with more than two edges to account nodes. Additionally, if ingestion is carried out parallelly and these edges are created by separate threads, these edges can be added into the graph. In a graph ingestion process, data can be transformed and stored in a graph model.

By way of additional illustration, consider another example embodiment which includes RDF parallel edge constraints in the OWL2 web ontology language. For instance, in OWL2, two nodes cannot be connected with owl:sameAs and owl:differentFrom edges. If ingestion is carried out parallelly and these edges are created by separate threads, these edges can be added into the graph. Further still, consider an example embodiment which includes a relational data primary key-foreign key (PK-FK) constraint. In such an embodiment, PK-FK relation may allow, for instance, only a one-to-many relationship.

Accordingly, as further detailed herein, one or more embodiments include partitioning and parallel loading of property graphs with constraints in an incremental fashion. Such an embodiment includes portioning an in-memory graph to support loading a partial graph with one or more source constraints, as well as performing thread assignment that considers and/or satisfies source constraints while loading data into a property graph.

FIG. 1 is a diagram illustrating system architecture, according to an embodiment of the invention. By way of illustration, FIG. 1 depicts input data 102 (e.g., relational data and/or RDF data) which are obtained and/or processed to create an in-memory graph 104 for batch processing. For example, in at least one embodiment, a batch of input data 102 is read, and an in-memory graph 104 is created from that batch. In such an embodiment, creating an in-memory graph includes reading a batch of data and programmatically creating a corresponding graph using user-defined data types. Most of the disk-based graph models, for example, have a way to create small graphs in memory that can subsequently be persisted to disk.

As also illustrated in FIG. 1, the in-memory graph 104 is processed, in conjunction with constraint data 106, by graph analysis and partitioning component 108. For example, in at least one embodiment, the in-memory graph 104 is partitioned, by graph analysis and partitioning component 108, into N disjoint vertex sets for N degrees of parallelism. As used herein, degrees of parallelism refers to the number of threads that can carry out the data load operation for creating a graph. Such partitioning can be carried out, for example, using one or more polynomial time partition algorithms (e.g., one or more breadth-first search (BF S) algorithms, one or more greedy number partitioning algorithms, and/or one or more complete greedy algorithms (CGAs)).

At least a portion of the output generated by graph analysis and partitioning component 108 includes two or more sub-graphs, which are provided, in conjunction with at least a portion of the constraint data 106, to job assignment partition component 110. Job assignment partition component 110 then generates and/or outputs threads 112-1, 112-2, ... 112-$m$ (collectively referred to herein as threads 112), which are stored in property graph database 114. For example, in one or more embodiments, graph analysis and partitioning component 108 generates $m^2$ sub-graphs which are loaded parallelly (e.g., m sub-graphs at a time), while taking relevant constraint requirements (derived from constraint data 106) into consideration. Accordingly, in one or more embodiments, job assignment partition component 110 creates m threads for m-degree of parallelism only once at the start of loading process of a dataset. Then job assignment partition component 110 repeatedly selects m sub-graphs from $m^2$ sub-graphs based on one or more constraints.

Accordingly, as illustrated in FIG. 1, one or more embodiments include creating at least one property graph based at least in part on node properties and adjacency lists consistency. In at least one embodiment, threads independently load each sub-graph through multiple transactions, and each thread stores a part of the graph onto a disk, respecting the user-defined or model-defined constraints. Together, at the end, all of the threads are used to create the final graph on a disk. Also, as used herein, adjacency list consistency ensures graph edges follow constraints given as input (e.g., duplicate edge constraint for RDF data).

FIG. 2A is a diagram illustrating an in-memory graph and FIG. 2B is a diagram illustrating a corresponding sub-graph, according to an example embodiment of the invention. Specifically, FIG. 2A depicts an in-memory graph representation 204 of a batch of data and FIG. 2B depicts a sub-graph 205 in matrix form. For example, by way merely of illustration, a cell (i, j) can represent a sub-graph with source nodes present in the $i^{th}$ partition of a corresponding in-memory graph and target nodes in the $j^{th}$ partition of the corresponding in-memory graph. Accordingly, in in-memory graph representation 204, values 0, 1, 2, and 3 represent node partitions, and in sub-graph 205, the y-axis is directed to source nodes while the x-axis is directed to target nodes.

Additionally, in connection with one or more embodiments, while loading a graph parallelly, such an embodiment includes ensuring that one or more relevant adjacency lists and node properties of at least one disjoint vertex set are modified by a single thread only; that is, for each disjoint vertex set, each adjacency list access is mutually exclusive. Therefore, in an example embodiment, a graph partitioned into $N^2$ sub-graphs, and for N degrees of parallelism, N of the sub-graphs are chosen such that: if (i,j) is loaded by one of the threads, no other thread is loading a (i, k) sub-graph wherein k={0, 1, ..., N} (i.e., no other thread is loading edges having a source in partition i); and if (i, j) is loaded by one of the threads, no other thread is loading a (k, j) sub-graph wherein k={0, 1, ..., N} (i.e., no other thread is loading edges having a target in partition j).

Such a problem is similarly to an N-Rooks problem, wherein N Rooks are placed on an N×N chess board such that no rook can attack another rook. Such an embodiment as detailed above includes using a constrained N-Rooks problem algorithm, wherein sub-graphs which are loaded are marked as restricted, and a sub-graph cannot be put in that location for a subsequent assignment. Additionally, it is to be noted that both constrained and unconstrained N-Rooks problems include polynomial time complexity.

Figure 3:
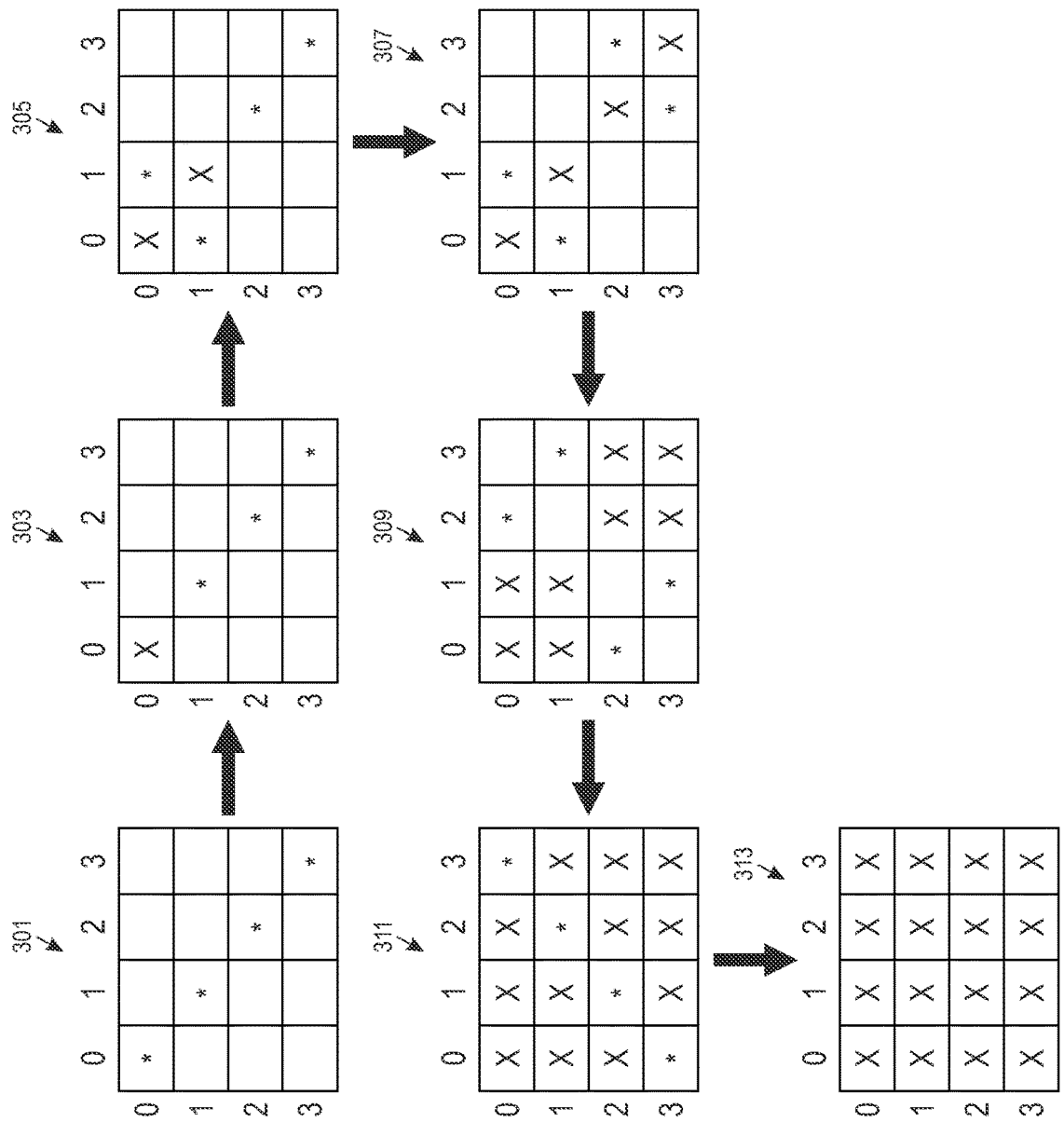
FIG. 3 is a diagram illustrating an example loading sequence of multiple threads, according to an example embodiment of the invention.

FIG. 3 is a diagram illustrating an example loading sequence of multiple threads, according to an example embodiment of the invention. By way of illustration, FIG. 3 depicts an example loading sequence wherein each matrix 301, 303, 305, 307, 309, 311 and 313 shows 16 sub-graphs. For each matrix, each cell (i,j) represents one subgraph for 0≤i,j≤3. Cells marked with * show ongoing loading for a sub-graph in each sequence, and cells marked with X show completed loading for a sub-graph.

Figure 4:
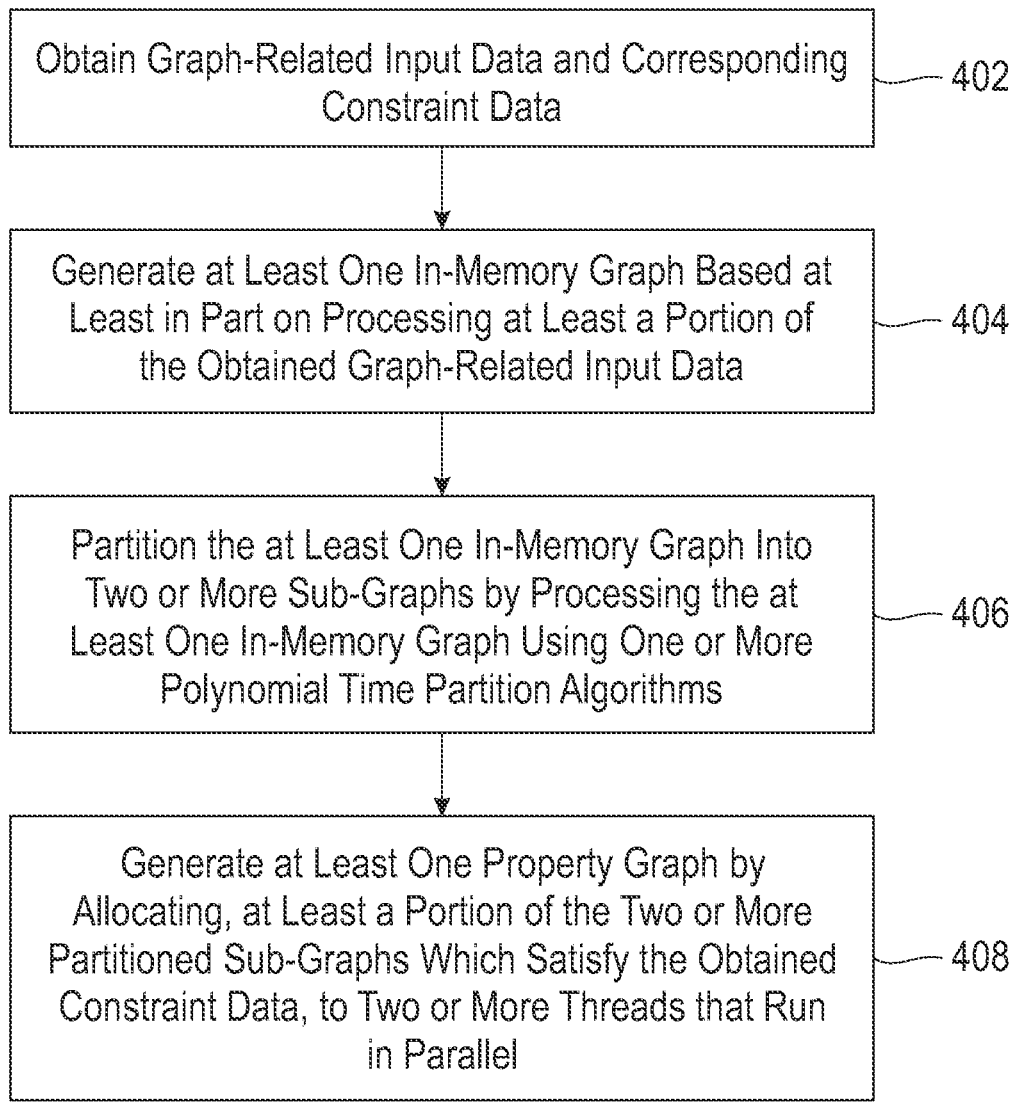
FIG. 4 is a flow diagram illustrating techniques according to an example embodiment of the invention.

FIG. 4 is a flow diagram illustrating techniques according to an embodiment of the present invention. Step 402 includes obtaining graph-related input data and corresponding constraint data (e.g., graph-related input data and corresponding constraint data that are user-defined and/or input data model-based). In at least one embodiment, obtaining graph-related input data includes obtaining relational data and/or resource description framework data. Step 404 includes generating at least one in-memory graph based at least in part on processing at least a portion of the obtained graph-related input data.

Step 406 includes partitioning the at least one in-memory graph into two or more sub-graphs by processing the at least one in-memory graph using one or more polynomial time partition algorithms. In at least one embodiment, partitioning the at least one in-memory graph includes partitioning the at least one in-memory graph into $N^2$ sub-graphs comprising N disjoint vertex sets for N degrees of parallelism. In such an embodiment, generating the at least one property graph includes loading, in a parallel manner, the $N^2$ sub-graphs, N sub-graphs at a time.

Additionally or alternatively, partitioning the at least one in-memory graph can include processing the at least one in-memory graph using one or more BFS algorithms, one or more greedy number partitioning algorithms, and/or one or more complete greedy algorithms.

Step 408 includes generating at least one property graph by allocating, at least a portion of the two or more partitioned sub-graphs which satisfy the obtained constraint data, to two or more threads that run in parallel. At least one embodiment can also include performing one or more automated actions based at least in part on the at least one property graph. In at least one embodiment, performing one or more automated actions includes training the one or more polynomial time partition algorithms based at least in part on the at least one property graph. Additionally or alternatively, performing one or more automated actions can include storing the at least one property graph in a corresponding database.

Further, in at least one embodiment, software implementing the techniques depicted in FIG. 4 can be provided as a service in a cloud environment.

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
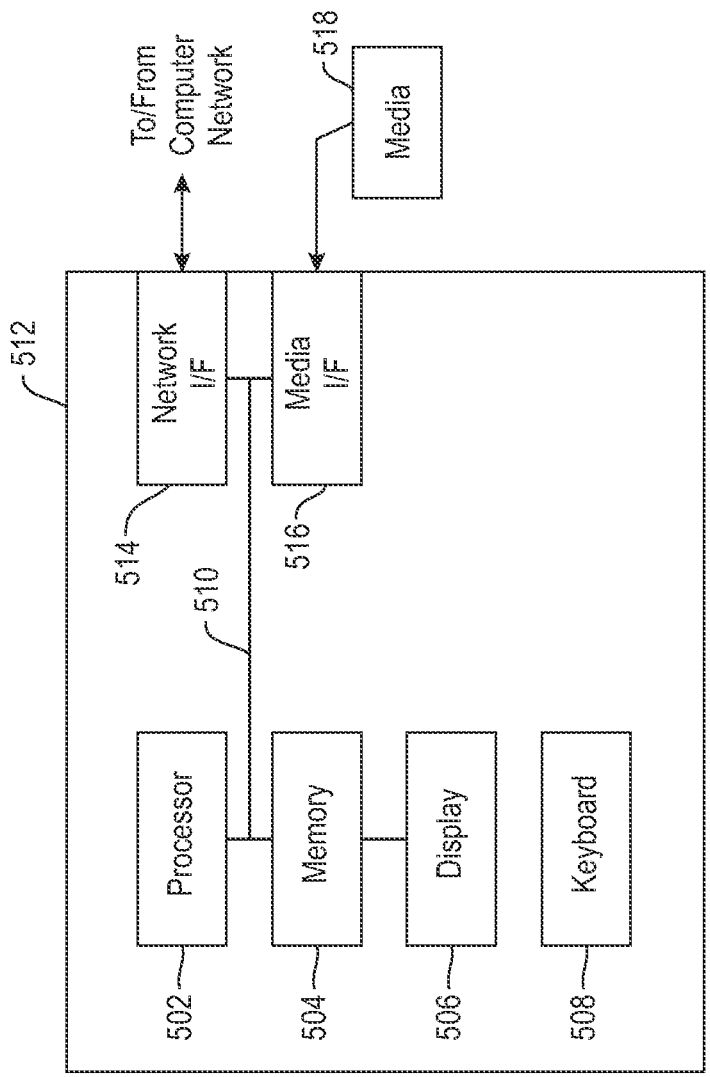
FIG. 5 is a system diagram of an example computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
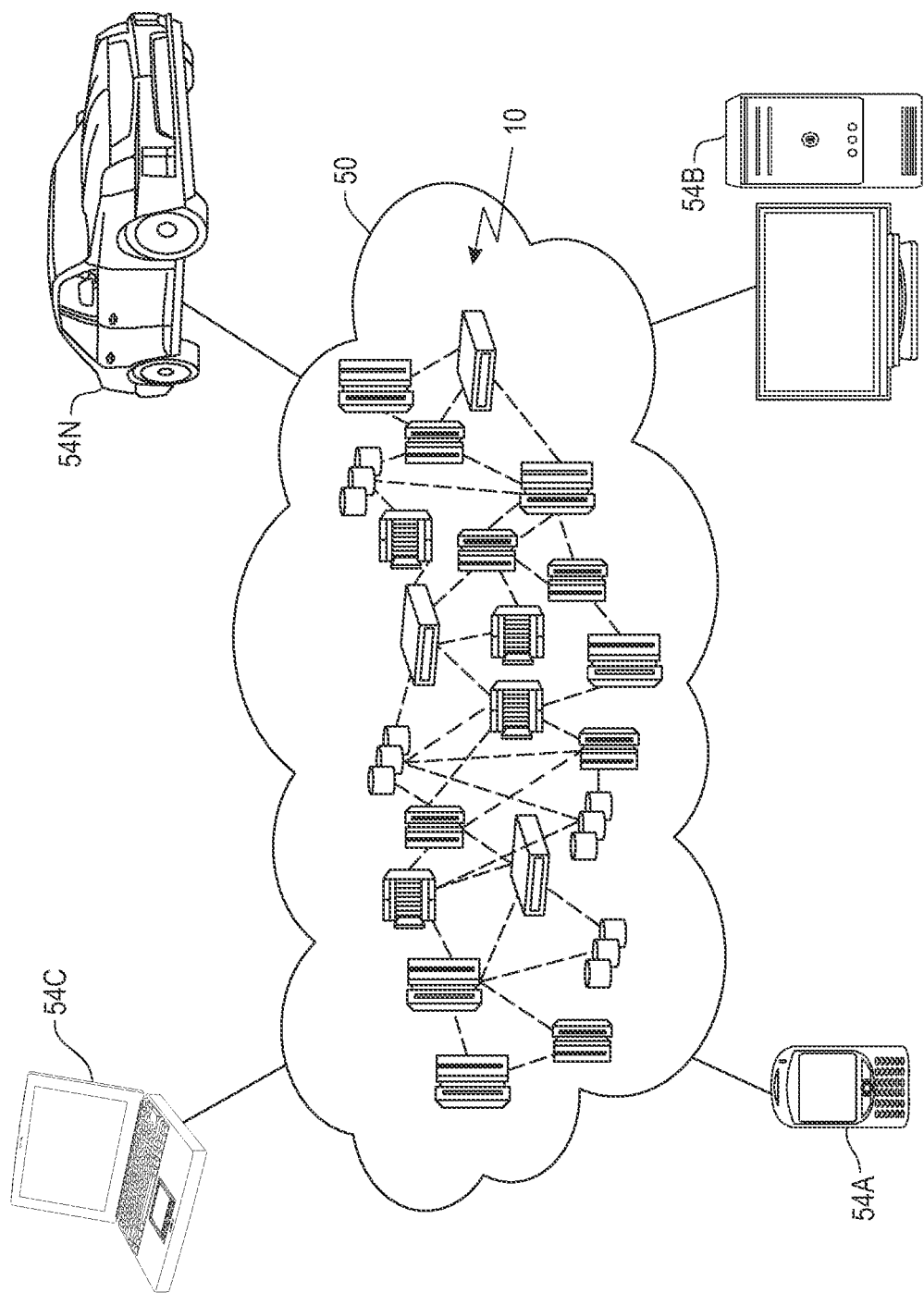
FIG. 6 depicts a cloud computing environment according to an example embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
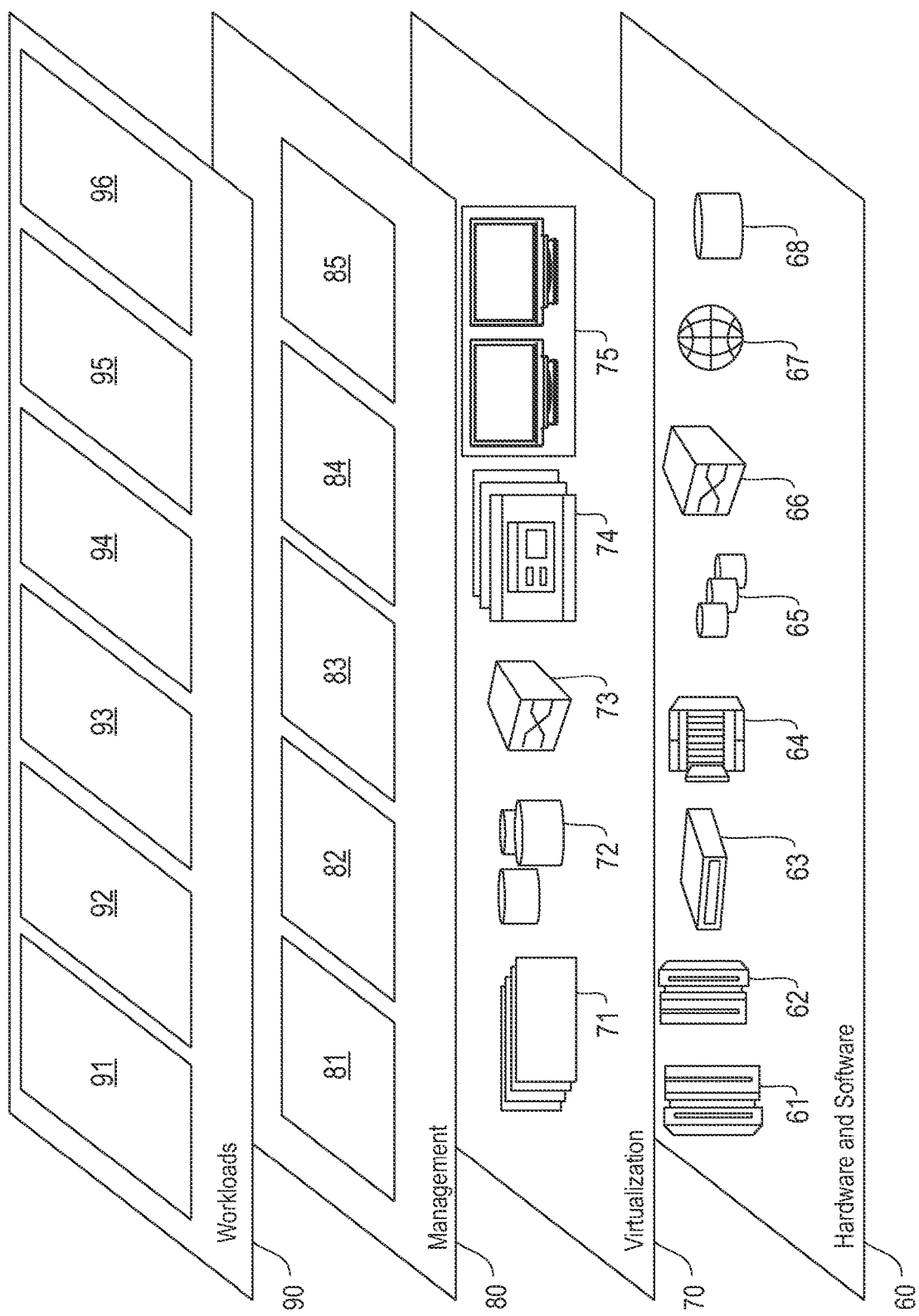
FIG. 7 depicts abstraction model layers according to an example embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and property graph partitioning and parallel loading 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically partitioning and parallel loading of property graphs while satisfying graph-related constraints.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining graph-related input data and corresponding constraint data, wherein the graph-related input data and corresponding constraint data are at least one of user-defined and input data model-based, and wherein the constraint data comprise adjacency information related to at least a portion of the graph-related input data, wherein the adjacency information comprises information identifying one or more incident edges of one or more vertices associated with the graph-related input data;
    generating at least one in-memory graph based at least in part on processing at least a portion of the obtained graph-related input data;
    partitioning the at least one in-memory graph into two or more sub-graphs by processing the at least one in-memory graph using one or more polynomial time partition algorithms comprising at least one or more greedy number partitioning algorithms; and
    generating at least one property graph by allocating, at least a portion of the two or more partitioned sub-graphs which satisfy at least a portion of the obtained constraint data comprising at least a portion of the adjacency information, to two or more threads configured to perform sub-graph loading operations in parallel, wherein each of the two or more threads stores a given portion of the two or more sub-graphs onto at least one disk in compliance with the at least a portion of the obtained constraint data;
    wherein the method is carried out by at least one computing device.

2. The computer-implemented method of claim 1, wherein obtaining graph-related input data comprises obtaining relational data.

3. The computer-implemented method of claim 1, wherein obtaining graph-related input data comprises obtaining resource description framework data.

4. The computer-implemented method of claim 1, wherein partitioning the at least one in-memory graph comprises partitioning the at least one in-memory graph into $N^2$ sub-graphs comprising N disjoint vertex sets for N degrees of parallelism.

5. The computer-implemented method of claim 4, wherein generating the at least one property graph comprises loading, in a parallel manner, the $N^2$ sub-graphs, N sub-graphs at a time.

6. The computer-implemented method of claim 1, wherein partitioning the at least one in-memory graph comprises processing the at least one in-memory graph using one or more breadth-first search algorithms.

7. The computer-implemented method of claim 1, further comprising:
training the one or more polynomial time partition algorithms based at least in part on the at least one property graph.

8. The computer-implemented method of claim 1, further comprising:
storing the at least one property graph in a corresponding database.

9. The computer-implemented method of claim 1, wherein software implementing the method is provided as a service in a cloud environment.

10. A computer program product comprising a computer readable storage medium having program instructions embodied therewith, the program instructions executable by a computing device to cause the computing device to:
obtain graph-related input data and corresponding constraint data, wherein the graph-related input data and corresponding constraint data are at least one of user-defined and input data model-based, and wherein the constraint data comprise adjacency information related to at least a portion of the graph-related input data, wherein the adjacency information comprises information identifying one or more incident edges of one or more vertices associated with the graph-related input data;
generate at least one in-memory graph based at least in part on processing at least a portion of the obtained graph-related input data;
partition the at least one in-memory graph into two or more sub-graphs by processing the at least one in-memory graph using one or more polynomial time partition algorithms comprising at least one or more greedy number partitioning algorithms; and
generate at least one property graph by allocating, at least a portion of the two or more partitioned sub-graphs which satisfy at least a portion of the obtained constraint data comprising at least a portion of the adjacency information, to two or more threads configured to perform sub-graph loading operations in parallel, wherein each of the two or more threads stores a given portion of the two or more sub-graphs onto at least one disk in compliance with the at least a portion of the obtained constraint data.

11. The computer program product of claim 10, wherein obtaining graph-related input data comprises obtaining relational data.

12. The computer program product of claim 10, wherein obtaining graph-related input data comprises obtaining resource description framework data.

13. The computer program product of claim 10, wherein partitioning the at least one in-memory graph comprises partitioning the at least one in-memory graph into $N^2$ sub-graphs comprising N disjoint vertex sets for N degrees of parallelism.

14. The computer program product of claim 13, wherein generating the at least one property graph comprises loading, in a parallel manner, the $N^2$ sub-graphs, N sub-graphs at a time.

15. The computer program product of claim 10, wherein partitioning the at least one in-memory graph comprises processing the at least one in-memory graph using one or more breadth-first search algorithms.

16. The computer program product of claim 10, wherein the program instructions executable by the computing device further cause the computing device to:
train the one or more polynomial time partition algorithms based at least in part on the at least one property graph.

17. The computer program product of claim 10, wherein the program instructions executable by the computing device further cause the computing device to:
store the at least one property graph in a corresponding database.

18. A system comprising:
a memory configured to store program instructions; and
a processor operatively coupled to the memory to execute the program instructions to:
obtain graph-related input data and corresponding constraint data, wherein the graph-related input data and corresponding constraint data are at least one of user-defined and input data model-based, and wherein the constraint data comprise adjacency information related to at least a portion of the graph-related input data, wherein the adjacency information comprises information identifying one or more incident edges of one or more vertices associated with the graph-related input data;
generate at least one in-memory graph based at least in part on processing at least a portion of the obtained graph-related input data;
partition the at least one in-memory graph into two or more sub-graphs by processing the at least one in-memory graph using one or more polynomial time partition algorithms comprising at least one or more greedy number partitioning algorithms; and
generate at least one property graph by allocating, at least a portion of the two or more partitioned sub-graphs which satisfy at least a portion of the obtained constraint data comprising at least a portion of the adjacency information, to two or more threads configured to perform sub-graph loading operations in parallel, wherein each of the two or more threads stores a given portion of the two or more sub-graphs onto at least one disk in compliance with the at least a portion of the obtained constraint data.

19. The system of claim 18, wherein partitioning the at least one in-memory graph comprises partitioning the at least one in-memory graph into $N^2$ sub-graphs comprising N disjoint vertex sets for N degrees of parallelism.

20. The system of claim 19, wherein generating the at least one property graph comprises loading, in a parallel manner, the $N^2$ sub-graphs, N sub-graphs at a time.

\* \* \* \* \*